US007989727B2

(12) United States Patent
Twarog et al.

(10) Patent No.: US 7,989,727 B2
(45) Date of Patent: Aug. 2, 2011

(54) HIGH VISIBILITY PLASMA ARC TORCH

(75) Inventors: Peter J. Twarog, West Lebanon, NH (US); Jesse A. Roberts, Cornish, NH (US)

(73) Assignee: Hypertherm, Inc., Hanover, NH (US)

( * ) Notice: Subject to any disclaimer, the term of this patent is extended or adjusted under 35 U.S.C. 154(b) by 1118 days.

(21) Appl. No.: 11/611,625

(22) Filed: Dec. 15, 2006

(65) Prior Publication Data

US 2008/0083711 A1 Apr. 10, 2008

Related U.S. Application Data

(60) Provisional application No. 60/825,453, filed on Sep. 13, 2006.

(51) Int. Cl.
*B23K 10/00* (2006.01)

(52) U.S. Cl. ......... 219/121.48; 219/121.39; 219/121.54; 219/121.52; 219/75; 315/111.21

(58) Field of Classification Search ............... 219/121.5, 219/121.51, 121.52, 121.48, 121.59, 74, 219/75; 313/231.31, 121.41; 315/111.21
See application file for complete search history.

(56) References Cited

U.S. PATENT DOCUMENTS

| | | | | |
|---|---|---|---|---|
| 4,149,052 A | | 4/1979 | Piber | |
| 4,514,616 A | | 4/1985 | Warner | |
| 4,580,032 A | | 4/1986 | Carkhuff | |
| 4,675,493 A | | 6/1987 | Gartland et al. | |
| 4,701,590 A | | 10/1987 | Hatch | |
| 4,940,877 A | | 7/1990 | Broberg | |
| 4,959,520 A | | 9/1990 | Okada et al. | |
| 4,967,055 A | | 10/1990 | Raney et al. | |
| 4,973,816 A | | 11/1990 | Haberman | |
| 5,013,885 A | | 5/1991 | Carkhuff et al. | |
| 5,039,837 A | | 8/1991 | Nourbakhsh et al. | |
| 5,164,569 A | | 11/1992 | Porra et al. | |
| 5,170,033 A | | 12/1992 | Couch et al. | |
| 5,216,221 A | * | 6/1993 | Carkhuff | 219/121.51 |
| 5,223,686 A | | 6/1993 | Benway et al. | |
| 5,310,988 A | * | 5/1994 | Couch et al. | 219/121.52 |
| 5,667,193 A | | 9/1997 | Chrzanowski | |
| 5,767,472 A | * | 6/1998 | Walters | 219/121.59 |
| 5,856,647 A | | 1/1999 | Luo | |
| 5,965,040 A | | 10/1999 | Luo et al. | |
| 5,994,663 A | | 11/1999 | Lu | |

(Continued)

FOREIGN PATENT DOCUMENTS

DE 3714995 11/1988

(Continued)

OTHER PUBLICATIONS

Partial International Search Report for International Application No. PCT/US2007/078248 (3 pages).

(Continued)

*Primary Examiner* — Mark H Paschall
(74) *Attorney, Agent, or Firm* — Proskauer Rose LLP

(57) ABSTRACT

An improved torch providing high visibility of the work zone to the operator, an increased viewing angle, and a reduced obstruction angle. The high visibility torch includes consumables adapted to maintain torch and consumables performance while reducing visual obstruction to the user, by coordinating, balancing, and optimizing design requirements and stack up tolerances. The invention also includes a related low-profile safety switch that promotes workpiece visibility and minimizes view obstruction.

24 Claims, 13 Drawing Sheets

U.S. PATENT DOCUMENTS

| | | | |
|---|---|---|---|
| 6,096,993 | A | 8/2000 | Marhic et al. |
| 6,156,995 | A | 12/2000 | Severance, Jr. et al. |
| 6,171,099 | B1 | 1/2001 | Lin |
| 6,191,381 | B1 | 2/2001 | Kabir |
| 6,350,960 | B1 | 2/2002 | Norris |
| 6,403,915 | B1 | 6/2002 | Cook et al. |
| 6,486,430 | B2 | 11/2002 | Naor |
| 6,683,273 | B2 | 1/2004 | Conway et al. |
| 6,689,983 | B2 | 2/2004 | Horner-Richardson et al. |
| 6,700,091 | B2 | 3/2004 | Jones et al. |
| 6,713,711 | B2 | 3/2004 | Conway et al. |
| 6,903,301 | B2 | 6/2005 | Jones et al. |

FOREIGN PATENT DOCUMENTS

| | | |
|---|---|---|
| EP | 0 208 134 A2 | 6/1986 |

OTHER PUBLICATIONS

Inner Logic® SR-45; Consumables, http://www.attcusa.com/plasma/InnerLogicSR-45i.php.

Lincoln® Procut 20, 55, 80 Consumables, http://www.attcusa.com/plasma/LincolnProcut20-55-80.php.

Hypertherm MAX 40cs/42/43 Brochure, PAC120/121TS/125T Consumables, Aug. 11, 2006, http://www.hypertherm.com/languages/english/PDF/TB_MAX4Ocs,42,43_oldrev.pdf.

Hypertherm HD-1070 HyDefinition® Torch Parts, May 1995, 4 pages.

ESAB Welding and Cutting Products Catalog, Apr. 1995, 17 pages.

* cited by examiner

HIGH VISIBILITY PLASMA ARC TORCH

CROSS REFERENCES TO RELATED APPLICATIONS

This application claims the benefit of U.S. Provisional Patent Application No. 60/825,453 filed on Sep. 13, 2006, the disclosure of which is hereby incorporated by reference.

FIELD OF THE INVENTION

The invention generally relates to the field of plasma arc torch systems and processes. More specifically, the invention relates to improved electrode, swirl ring and safety configurations for use in a plasma arc torches, and related methods.

BACKGROUND OF THE INVENTION

Plasma arc torches are widely used for the high temperature processing (e.g., cutting, welding, and marking) of metallic materials. A plasma arc torch generally includes a torch body, an electrode mounted within the body, an emissive insert disposed within a bore of the electrode, a nozzle with a central exit orifice, a shield, electrical connections, passages for cooling and arc control fluids, a swirl ring to control the fluid flow patterns, and a power supply. The torch produces a plasma arc, which is a constricted ionized jet of a plasma gas with high temperature and high momentum. The gas can be non-reactive, e.g. nitrogen or argon, or reactive, e.g. oxygen or air.

In the process of plasma arc cutting or marking a metallic workpiece, a pilot arc is first generated between the electrode (cathode) and the nozzle (anode) within a torch. When operating in this pilot arc mode the electrode can separate from the nozzle, forming an arc between these electrode and nozzle, e.g., as described in U.S. Pat. No. 4,791,268, the contents of which are incorporated herein by reference. The gas passing between the nozzle and the electrode is ionized to form a plasma, which then exits an exit orifice of the nozzle. The gas can be passed through a swirl ring to impart a tangential motion to the gas as it passes through the torch, thereby improving torch performance. When the torch is moved near a workpiece the arc contacts the workpiece and the current return path then transfers from the nozzle to the workpiece. Generally the torch is operated in this transferred plasma arc mode, which is characterized by the flow of ionized plasma gas from the electrode to the workpiece, with the current return path being from the workpiece back to the power supply. The plasma thus generated can be used to cut, weld, or mark workpieces.

In addition to blowback operation described above, alternative known techniques include blow forward technologies, in which the nozzle separates from a stationary nozzle. See, e.g., U.S. Pat. No. 5,994,663, the contents of which are incorporated herein by reference.

Dimensions of the torch are determined by the size and configuration of the consumables discussed above, e.g., the electrode, swirl ring, nozzle, and shield. Design of these consumables is highly technical and has a dramatic impact on torch life and performance. The electrode is generally surrounded by a swirl ring, a nozzle, and perhaps a shield. All of these components, and the way in which they are designed and combined, affect the overall torch dimensions, configuration, weight, cost, and other parameters.

Moreover, safety has always been a concern with plasma cutting torches because of the risk of electrical shock and burns. To minimize such risks, various safety systems have been employed to protect the torch operator. Some safety systems are designed to disengage the power supplied to the torch when components of the torch are missing or incorrectly assembled in the torch handle. Often, when operating a plasma cutting torch, consumable parts must be removed for inspection or replacement, and the torch components are disassembled and reassembled on site and immediately returned to service. This operation can at times be rushed, performed in poorly lit or dirty environments, or otherwise implemented incorrectly, leading to potentially dangerous errors in the reassembly and operation of the torch. The aforementioned safety systems typically include a sensing device that is engaged when a removable torch component is placed in its proper position in the torch handle. When functioning properly, the sensing device allows power from the power supply to supply the torch only when the removable component is placed in its proper position in the torch handle.

Existing safety systems, however, position sensitive safety system components near the operating end of the torch, which exposes these components to high temperatures generated at the torch tip. Existing safety systems also employ bulky handle designs to accommodate safety system components, but those bulky designs tend to obstruct or limit the operator's view of the workpiece. Each of these limitations can impede the operation of the torch and the efficient replacement of worn replaceable components, or lead to the failure of the safety system and, ultimately, to injury to the operator. For example, as shown in EP 0208134, a safety switch is placed near the end of a torch assembly, exposing the switch to the high temperatures associated with the torch. U.S. Pat. No. 6,096,993 shows an actuating element that is moved by an extension of a shroud, which requires a bulkier design around the torch component assembly to accommodate the actuating element.

In view of the limitations with above-described safety systems, it is desirable for a torch handle to have a safety system that positions sensitive safety components in the torch handle away from high temperature areas, and that does not add bulk to the torch assembly or obstruct the operator's view of the workpiece.

SUMMARY OF THE INVENTION

Torch geometry and dimensions, such as width and length, are affected by the design and configuration of torch consumables such as the electrode, swirl ring, nozzle, and shield. Bulky design results in wide configurations that have a poor operator viewing angle. These problems are especially pronounced for manual (hand held) torches that are manipulated by an operator. A restricted viewing angle about the torch by the operator of the torch, inhibiting his view of the cut as the workpiece is processed by the plasma, adversely affects cutting performance. Additionally, frequently during torch operation the operator is constrained by space or obstructions that further inhibit his visibility.

What is needed is a torch that provides improved workpiece visibility during high temperature metal processing without sacrificing torch life, performance, or the life expectancy of torch consumables. The present invention achieves these objectives by carefully balancing the many design parameters of the torch consumables to achieve a streamlined, functional torch having a large work zone viewing angle while still maintaining performance and reliability.

Safety switch design is another design parameter that affects torch visibility. Thus, another objective of the invention is to provide a switch assembly with a switch positioned away from the end of the torch. Yet another objective of the invention is to provide a pin disposed in a passage through the torch body of the torch to allow a narrow profile for the torch handle.

One aspect of the invention features an electrode for a high visibility plasma arc cutting torch. The electrode includes an elongated electrode body that has a first end and a second end. The body defines a bore in the first end for receiving an insert. The electrode body includes a first body portion extending from the first end and having a first length and a first width. It also includes a second body portion extending to the second end and comprising a second length and a second width. In some embodiments, a ratio of the second width to the first width is at least about 2, and a ratio of the first length to the first width is at least about 3. The ratio of the second width to the first width can be between about 2 and 2.5, and the ratio of the first length to the first width can be between about 3.5 and 4.5. Embodiments also include a ratio of the first length to the first width of at least about 4.

A distance from the first end to the second end of the body of the electrode can define an overall length, and a ratio of the first length to the overall length can be at least about 0.6. The second body portion of the electrode can include a cooling structure, e.g., at least one rib, and the at least one rib can at least partially define a cooling gas passage adjacent an exterior surface of the second body portion. The second body portion can further define a shoulder having an imperforate face that blocks passage of a gas flow through the second body portion. The imperforate face can be located, e.g., at either end of the second body portion. Moreover, the cooling structure can be configured such that at least one of the cooling gas passage or the imperforate face can be configured to provide a gas pressure drop sufficient to enable a motion of the electrode with respect to an anode (e.g., a nozzle), such as a motion associated with a blowback operation of the torch electrode. The first and second body portions of the electrode can be formed integrally of a solid material (e.g., copper). In some embodiments, the first width and the second width include diameters. For example, the first and second body portions can each include an external shape, perimeter, or circumference that is circular.

Embodiments include methods of cutting a workpiece that comprise providing a plasma arc torch that includes an embodiment of the electrode described above, and supplying an electrical current (i.e., electrical power) to the electrode, thereby energizing the torch. Embodiments also include torches, e.g., a plasma arc torch, and/or systems that include the electrodes described above. The systems can include the electrode, torch, power supply, control configurations (such as a CNC and a torch height controller), and other peripherals such as are known to those of skill in the art.

Another aspect of the invention features an electrode for a high visibility plasma arc cutting torch that includes an elongated electrode body that has a first end and a second end. A distance from the first end to the second end can define an overall length, and the body can define a bore in the first end for receiving an insert. The electrode body can include a first body portion that extends from the first end and has a first length and a first width. The electrode can also include a second body portion that extends to a second end and includes a second length and a second width. A ratio of the second width to the first width can be at least about 2, and a ratio of the first length to the overall length can be at least about 0.6. In some embodiments, the ratio of the second width to the first width is between 2 to 2.5. The ratio of the first length to the overall length can be between about 0.6 and 0.7. Embodiments include an electrode with a ratio of the first length to the first width of at least about 3, or of at least about 4 for other embodiments.

The second body portion of the electrode can include a cooling structure comprising at least one rib that at least partially defines a cooling gas passage adjacent an exterior surface of the second body portion. The second body portion can further define a shoulder having an imperforate face that blocks passage of a gas flow through the second body portion. At least one of the imperforate face or the cooling gas passage can be configured to provide a gas pressure drop sufficient to enable a motion of the electrode with respect to an anode, such as a blowback operation of the torch. However, other cooling structure features can also be configured to provide this functionality.

In some embodiments, the first and second body portions of the electrode are formed integrally of a solid material (such as copper, silver, or other metallic materials that are highly electrically and thermally conductive). Embodiments also include electrodes in which at least one of the first width or the second width includes a diameter, such as is described above.

Embodiments include methods of cutting a workpiece that comprise providing a plasma arc torch that includes an embodiment of the electrode described above, and supplying an electrical current (i.e., electrical power) to the electrode, thereby energizing the torch. Embodiments also include torches, e.g., a plasma arc torch, and/or systems that include the electrodes described above. The systems can include the electrode, torch, power supply, control configurations (such as a CNC and a torch height controller), and other peripherals such as are known to those of skill in the art.

Yet another aspect of the invention features an electrode for a plasma arc cutting torch that includes an elongated electrode body having a first end and a second end, such that a distance from the first end to the second end defines an overall length. A bore can be disposed in the first end of the electrode, for receiving an insert. The electrode body can include a first body portion that extends from the first end and that has a first length and a first width. A ratio of the first length to the first width can have a value of between about 4 and about 9. The electrode can also include a second body portion that extends to the second end and that includes a second length and a second width. Preferably, the second width is greater than the first width.

Embodiments include an electrode in which the ratio of the first length to the first width has a value of between about 4 and 8, or of between about 4 and 7 for other embodiments. In yet other embodiments, the ratio of the first length to the first width has a value of between about 5 and 7.

The second body portion of the electrode can include a cooling structure comprising at least one rib that at least partially defines a cooling gas passage adjacent an exterior surface of the second body portion. The second body portion can further define a shoulder having an imperforate face that blocks passage of a gas flow through the second body portion. At least one of the imperforate face or the cooling gas passage can be configured to provide a gas pressure drop sufficient to enable a motion of the electrode with respect to an anode, such as a blowback operation of the torch. However, other cooling structure features can also be configured to provide this functionality.

In some embodiments, the first and second body portions of the electrode are formed integrally of a solid material (such as copper, silver, or other metallic materials that are highly electrically and thermally conductive). Embodiments also include electrodes in which at least one of the first width or the second width includes a diameter, such as is described above.

Embodiments include methods of cutting a workpiece that comprises providing a plasma arc torch that includes an embodiment of the electrode described above, and supplying an electrical current (i.e., electrical power) to the electrode, thereby energizing the torch. Embodiments also include torches, e.g., a plasma arc torch, and/or systems that include the electrodes described above. The systems can include the electrode, torch, power supply, control configurations (such as a CNC and a torch height controller), and other peripherals such as are known to those of skill in the art.

Another aspect of the invention features a gas control swirl ring for a high visibility plasma arc torch that includes a body having a first end and a second end, and a central gas passage extending from the first end to the second end. The body includes a first body portion having a first outside diameter and a plurality of gas passages, such as gas distribution holes, which are in fluid communication with the central gas passage. The body can also include a second body portion having a second outside diameter that is larger than the first outside diameter. Although referred to as outside diameters, the exterior perimeter of these body portions need not be strictly circumferential. Other geometries that permit functional operation of the swirl ring can also be used.

The first body portion of the gas control swirl ring can be configured to be oriented towards a workpiece during processing of the workpiece. The second body portion (having the larger diameter) can be configured to be oriented away from the workpiece. Embodiments of the invention include gas control swirl rings that include a transition portion between the first body portion and the second body portion. The transition portion can include at least one of, e.g., a step, a bevel, or a taper. An exterior surface of the transition portion can include the step, bevel, or taper. An interior surface of the transition portion can also include one or more of these shapes/configurations. Of course, other shapes and contours can also be used. Moreover, in some embodiments, the transition portion includes one or more gas passages, such as gas distribution holes or channels. The gas passage(s) in the transition portion and/or the first body portion of the gas control swirl ring can include canting, to impart a swirling, radial, axial, and/or tangential motion to the gas as it flows into the central gas passage through the gas passage(s).

Embodiments also include gas control swirl rings in which the first body portion has a first inside diameter that is different than a second inside diameter of the second body portion. The second inside diameter can be larger than the first inside diameter, e.g., to provide sufficient bearing surface to support, stabilize, and align an electrode, and to help promote improved visibility of a work zone (i.e., where the plasma arc impinges on or penetrates a workpiece). The second body portion of the electrode can also include an interior surface that is configured to slideably engage with and provide a bearing and alignment surface for supporting an adjacent internal structure, such as an electrode. The gas control swirl ring can be formed of a dielectric material.

Additional aspects of the invention also include torches and cutting systems that use the consumables (e.g., electrodes and swirl rings) discussed above, as well as methods of manufacturing these consumables using manufacturing techniques that are known to those of skill in the art.

Embodiments of the invention include methods of cutting a workpiece that comprises providing a plasma arc torch that includes an embodiment of the gas control swirl ring described above, and supplying an electrical current (i.e., electrical power) to energize the torch. Embodiments also include torches, e.g., a plasma arc torch, and/or systems that include the gas control swirl ring described above. Such systems can include the electrode, torch, power supply, control configurations (such as a CNC and a torch height controller), and other peripherals such as are known to those of skill in the art.

Another aspect of the invention features a pin disposed in a passage through the torch body. The positioning of the pin at least partially within the outer periphery of the anode body allows the size of handle assembly to remain minimized and allows a narrower profile to the torch. A safety switch is provided in the torch handle away from the hot plasma generated at the torch tip, with the pin arranged to engage the switch.

Another aspect of the invention features a switch assembly that can detect a position of a consumable torch component in a plasma cutting torch. The switch assembly can include a switch that can be mounted substantially within a torch handle of the torch and electrically connected to a control circuit of the torch. The switch assembly can also include a torch body that can be at least partially contained within the torch handle, and a pin that can have a first end and a second end. The pin can be slideably disposed in a passage through the torch body, and the first end can be disposed to engage the consumable torch component and the second end can be disposed to engage the switch. The second end of the pin can activate the switch when the first end of the pin engages the torch component. Embodiments include a torch body that can be electrically conductive, and a torch body that can comprise a metal. Additional embodiments include a spring that can engage the pin and the spring can be biasing the pin away from the switch, a spring that can engage the pin and the spring can be biasing the pin in a direction of the first end, and a spring that can be biasing the switch in an open configuration. Further embodiments include a spring that can be within a cavity of the pin and a first end of the spring that can engage the pin and a second end of the spring that can engage a spring mount, a spring mount that can be a screw, at least a portion of the pin can be visible from an exterior of the torch when the torch body and torch component are assembled with the torch handle, and at least a portion of the pin that can be visible from an exterior of the torch when the pin engages the torch component or engages the switch. More embodiments include a passage that can be at least partially disposed within an outer diameter of the torch body, an axis of the pin that can be offset from an axis of the switch, a pin that can have a flange at the second end and the flange can engage the switch, and a second end of the pin that can extend from the torch body to engage the switch.

Embodiments include torches, e.g., a plasma arc torch, and/or systems that include the switch assembly described above. The invention can also be used with entire plasma cutting systems, such as are known to those of skill in the art. The systems can include the electrode, torch, power supply, control configurations (such as a CNC and a torch height controller), and other peripherals such as are known to those of skill in the art.

Yet another aspect of the invention features a switch assembly that can detect a position of a removable torch component in a plasma cutting torch. The switch assembly can include a switch that can be mounted substantially within a torch handle of the torch and electrically connected to a control circuit of the torch. The switch assembly can also include a torch body that can be at least partially contained within the torch handle and that can define an axial passage therein, and a pathway can be defined at least in part by the passage. The passage can extend between the torch component and the switch. A pin can be slideably disposed in the at least part of the pathway, and one end of the pin can engage the switch and another end of the pin can engage the torch component. Embodiments include a torch body that can be electrically conductive, and a torch body that can be made of a metal. Additional embodiments include a spring that can engage the pin and the spring can bias the pin away from the switch. The spring can engage the pin and the spring can bias the pin in a direction away from the switch. The spring can bias the switch in an open configuration. Further embodiments include a cavity of the pin and a first end of the spring that can engage the pin, and a second end of the spring that can engage a spring mount. The spring mount can be a screw, and at least a portion of the pin can be visible from an exterior of the torch when the torch body and torch component are assembled with the torch handle. More embodiments include at least a portion of the pin that can be visible from an exterior of the torch when the pin engages the torch component or engages the switch. The pin can be at least partially disposed within an outer diameter of the torch body, and an axis of the pin can be offset from an axis of the switch. Yet more embodiments include a pin that can have a flange at one end and the flange can be configured to engage the switch. An end of the pin can extend from the torch body to engage the switch.

Embodiments include torches, e.g., a plasma arc torch, and/or systems that include any of the switch assemblies described above. The invention can also be used with entire plasma cutting systems, such as are known to those of skill in the art. The systems can include the electrode, torch, power supply, control configurations (such as a CNC and a torch height controller), and other peripherals such as are known to the skilled artisan.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

Figure 1:
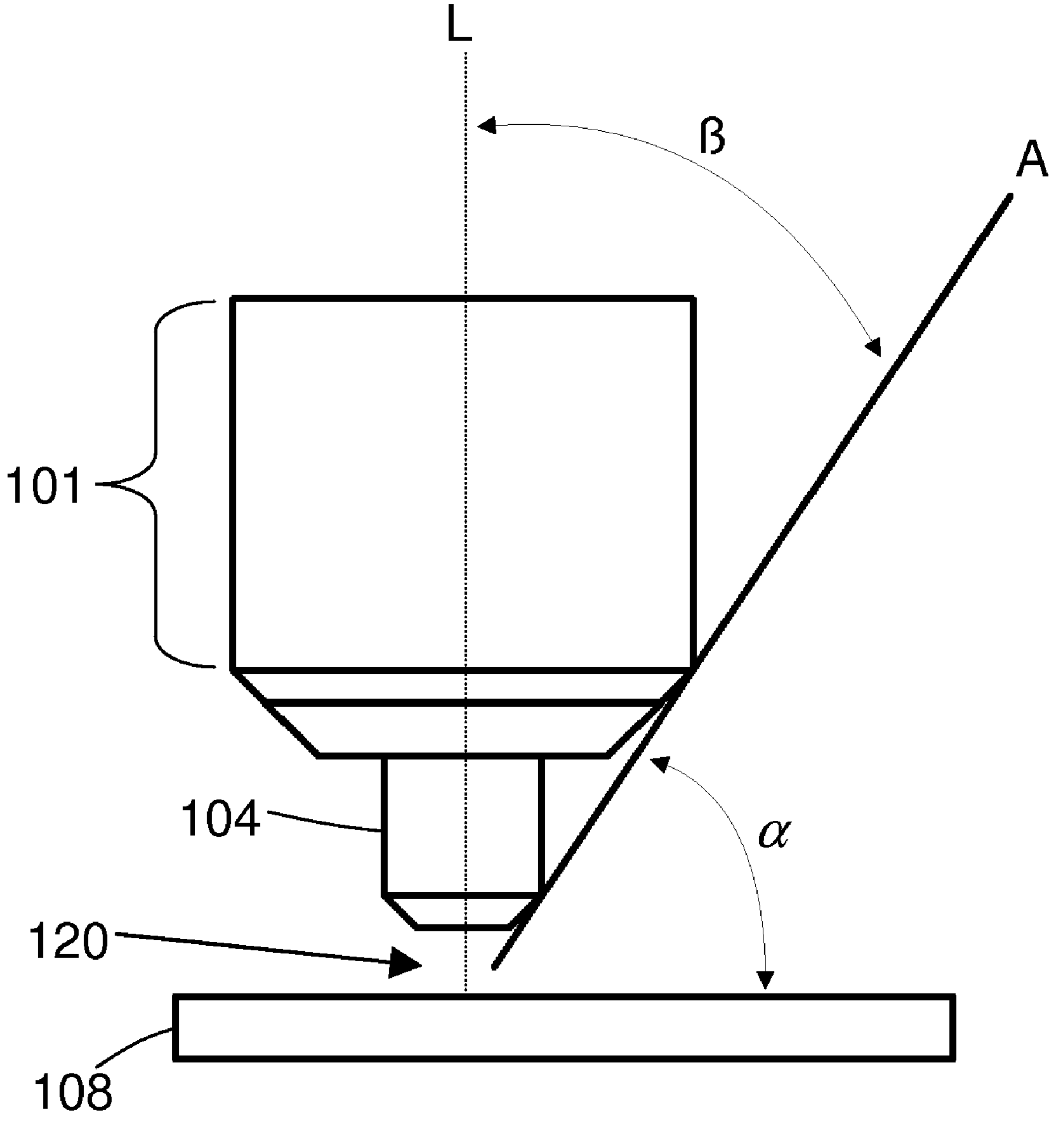
FIG. 1 PRIOR ART
FIG. 1 is a perspective view of a torch tip of a known plasma arc torch.

FIG. 1 is a perspective view of a torch tip of a known plasma arc torch. A nozzle 104 is held in place by a retaining cap 101 which secures the nozzle 104 to a torch body (not shown). An electrode (not shown) is disposed within the torch body. A proximal portion of the nozzle 104 is located near the workpiece 108 during operation of the torch. A viewing angle, α, of the work zone 120 extends from the surface of the workpiece 108 to reference line A. Reference line A is drawn as a tangent to the exterior surface of the torch, as shown. For a PACII OT torch, available from Hypertherm, Inc. of Hanover, N.H., the viewing angle is approximately 55° (90°-35°), as illustrated. Conversely, a work zone obstruction angle β established by this torch is 35° from a longitudinal axis of the torch L, and this obstruction angle extends outwardly in at least two directions from the torch.

Figure 2:
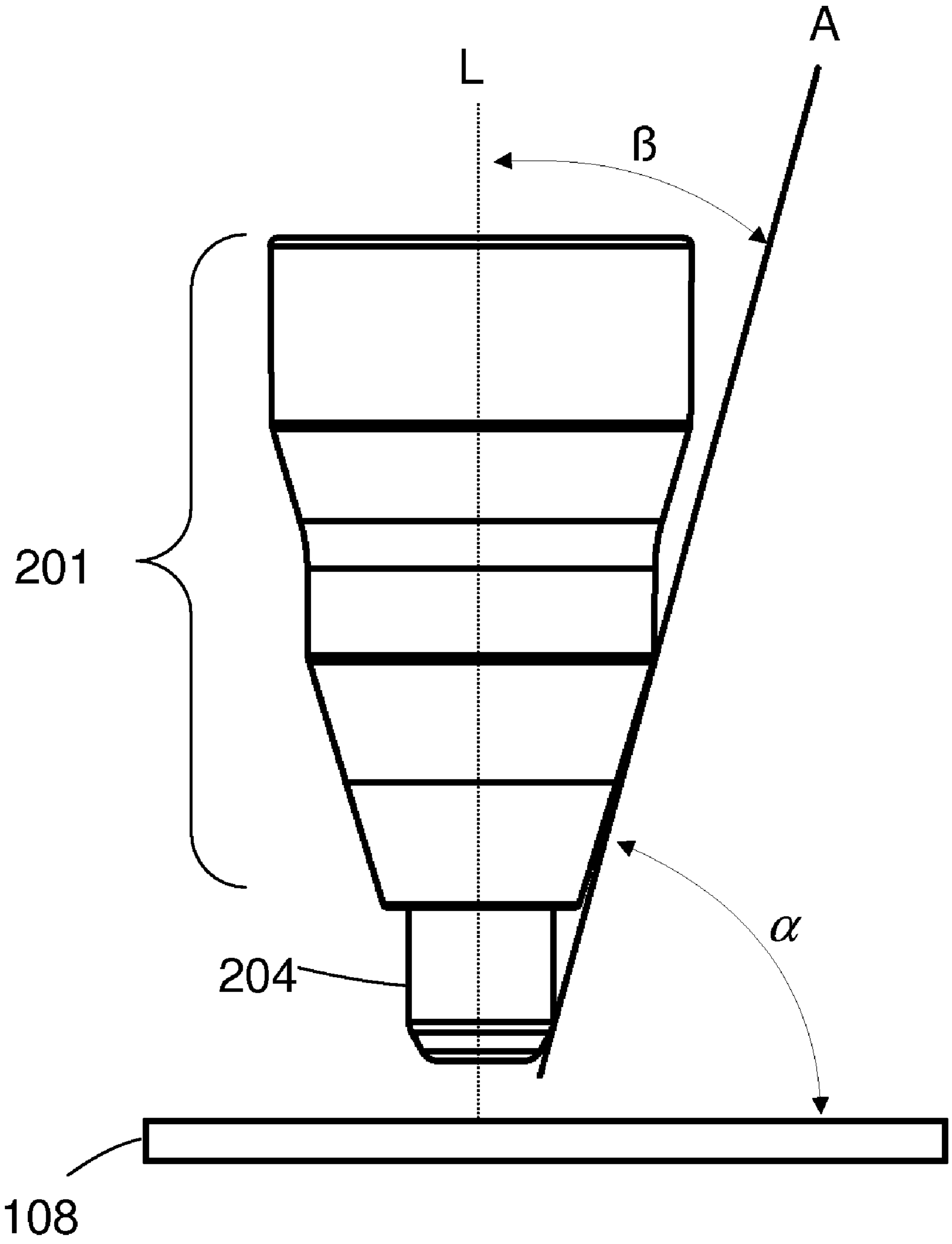
FIG. 2 is a perspective view of a torch tip of a plasma arc torch according to an embodiment of the invention.

FIG. 2 is a perspective view of a torch tip of a plasma arc torch according to an embodiment of the invention. Nozzle 204 is held in place by a retaining cap 201 which secures the nozzle 204 to a torch body (not shown). However, in this embodiment the viewing angle α of the work zone offered to a user of the torch is 75°, which offers to the operator a significantly enhanced view of the area of the workpiece upon which work is being performed. The view obstruction angle β presented by this embodiment of the torch is only 15°. That is, an angle established from centerline of the torch L to a tangential line A at the exterior of the torch tip is merely 15°. As described below, consumable design characteristics are carefully chosen and balanced to allow the view obstruction angle β to be reduced to such an extent.

Figure 3:
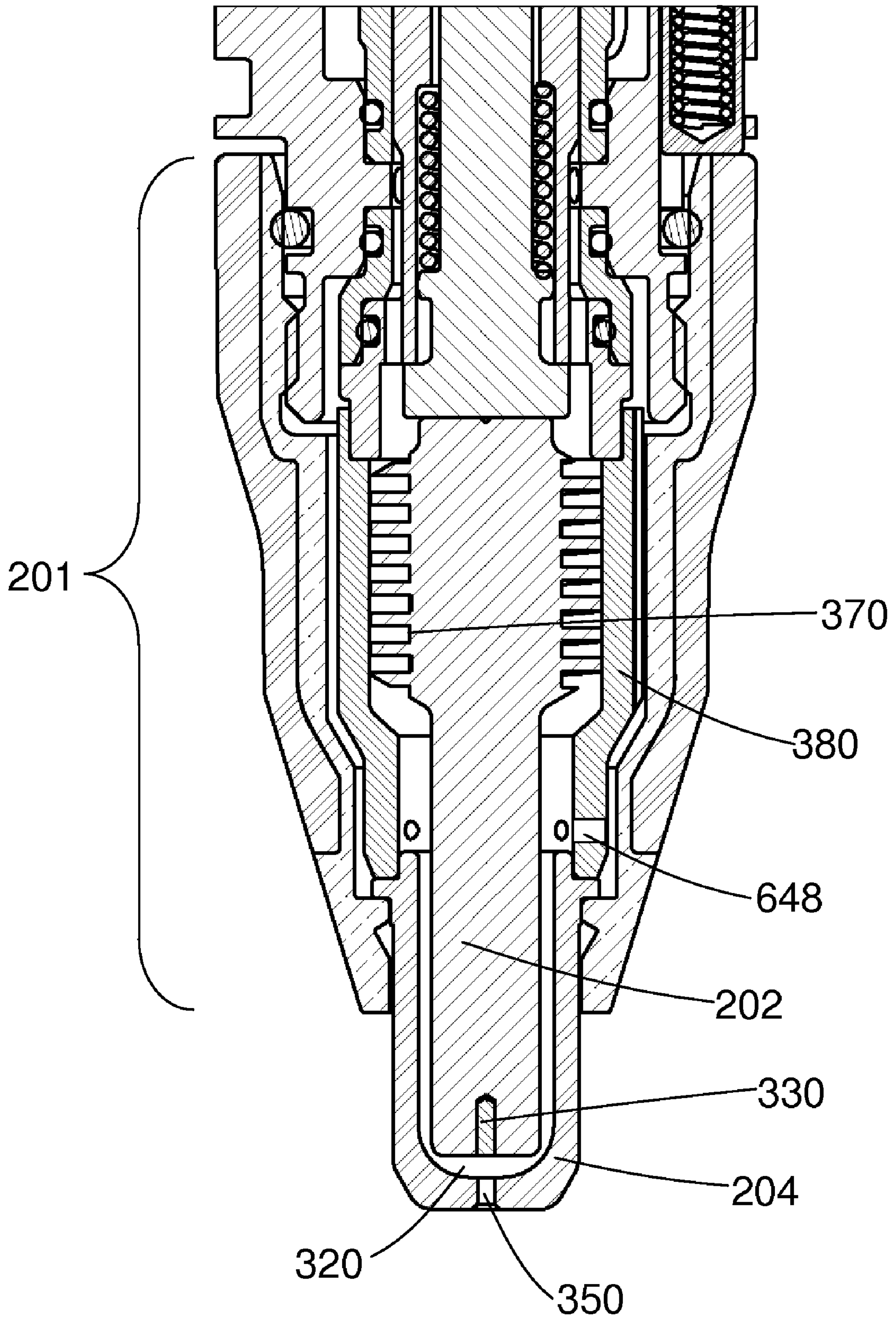
FIG. 3 is sectional view of the torch tip of FIG. 2 that illustrates a stack up configuration of the consumables.

FIG. 3 is sectional view of the torch tip of FIG. 2 that illustrates a stack up configuration of the consumables according to an embodiment of the invention. Proportions of the electrode 202, swirl ring 380, and other consumables are configured to establish an enhanced viewing angle for the user of the torch. An electrode 202 within the retaining cap 201 has an emissive element 330 disposed at one end of the electrode 202. The emissive element 330 can be formed of, e.g., hafnium or zirconium, and is disposed near an exit orifice 350 of the nozzle 204. The electrode 202 can also include additional surface area at a back or aft portion of the electrode, to promote cooling of the electrode by a gas flow. The illustrated embodiment includes a "spiral groove" cooling structure 370 for this purpose, such as those described in U.S. Pat. No. 4,902,871, the contents of which are incorporated herein by reference. The cooling structure can also be used to establish a pressure drop as gas flows between a front, or proximal portion of the electrode 202 and the distal end. The pressure drop thus established can be used to cause the electrode 202 to "blow back," as described above and known to those of skill in the art.

Figure 4A:
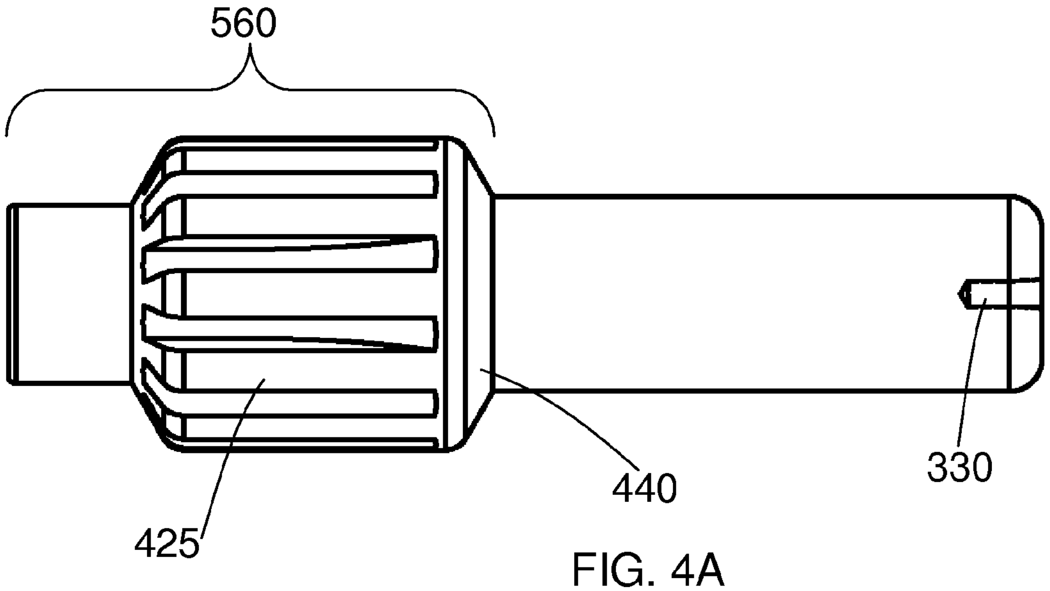
FIGS. 4A and 4B show two exemplary embodiments of the electrode of the invention, depicting different types of cooling and bearing surfaces.
Figure 4B:
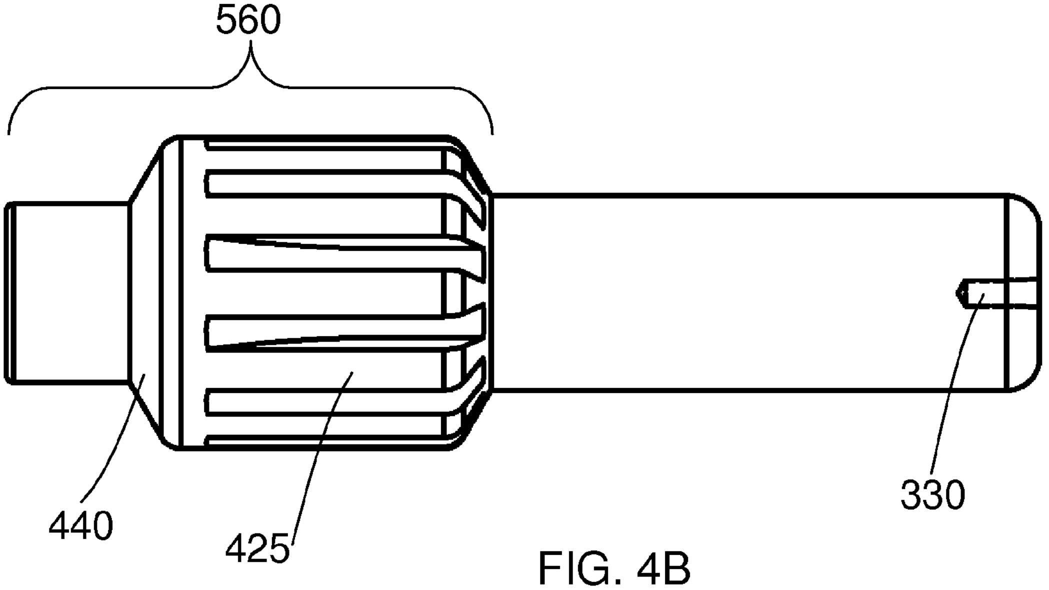

Alternative cooling structure arrangements can also be used to accomplish these objectives. Embodiments include electrodes (e.g., 202) having an imperforate face, such as those described in U.S. Pat. No. 6,403,915, the contents of which are incorporated herein by reference. FIGS. 4A and 4B illustrate two embodiments of electrodes (e.g., 202) having such features. Such embodiments can include longitudinal or axial fins 425 for cooling, instead of or in addition to spiral-groove type fins. One or more ribs can be used to accomplish this, and they can be oriented longitudinally. The rib can at least partially establish a cooling passage adjacent an exterior surface of the second body portion 560. Moreover, as illustrated, this second body portion 560 can include an imperforate face 440 to block passage of the gas flow through the second body portion 560, thereby increasing the amount of pressure drop created, e.g., for electrode blowback purposes. However, embodiments include using rib(s) or fins, without an imperforate face, to meet the pressure drop requirements.

Other cooling structure 370 configurations are also possible. For example, one or more channels or passageways can be formed (e.g., drilled, milled, cast, molded, etc.) through the second body portion 560. Various combinations of internal and external geometries can also be used. Design requirements require provision of sufficient cooling, establishment of sufficient external surface area for electrode bearing and alignment, and establishment of sufficient pressure drop upon introduction of the blowback gas flow.

The resultant force on the electrode caused by the associated pressure drop can be used to move the electrode 202 with respect to an anode (e.g., the nozzle 204). Preferred embodiments use the cooling structure 370 to both establish blow back pressure drop and to provide surface area for electrode 202 cooling.

Referring back to FIG. 3, a swirl ring 380 surrounds a portion of the electrode and provides a bearing surface for the electrode 202. Contact between an inner surface of the swirl ring 380 and an outer surface of the electrode 202 is used to align and guide the electrode 202 as it translates between pre-start and operational positions within the torch. The swirl ring 380 includes plasma gas inlet ports 648, which can be used to impart a swirling, tangential motion to the incoming plasma gas as it flows toward the electrode 202. Nozzle 204 is disposed near an end of the torch. A plasma chamber 320 is defined between the nozzle 204 and the electrode 202.

Figure 5:
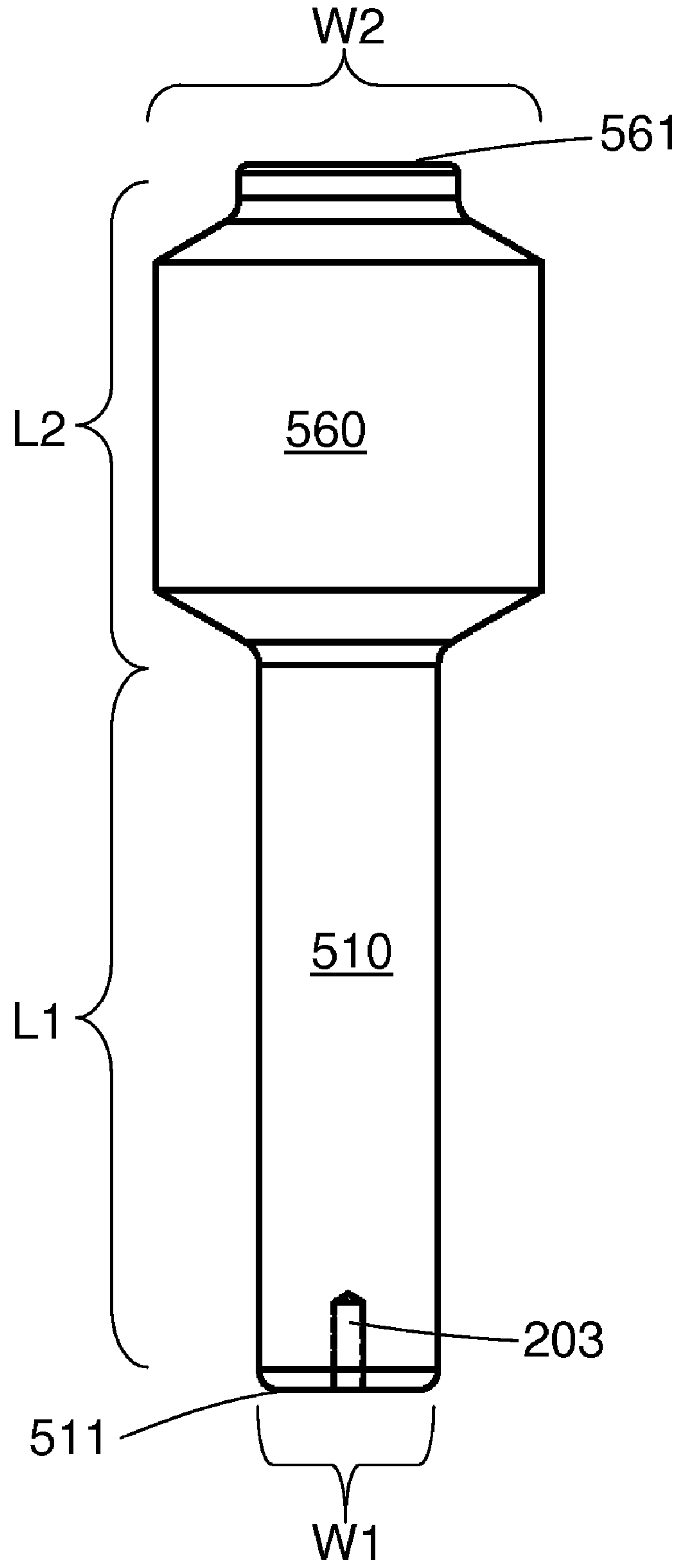
FIG. 5 is an illustration of an electrode that incorporates principles of the invention.

FIG. 5 is an illustration of an electrode that incorporates principles of the invention. Proper design of the electrode is a key requirement to achieving a torch stack up that has high visibility features. A reliable high visibility torch requires an electrode with proper ratios and tolerances. For example, the electrode illustrated in FIG. 5 has a first body portion 510 and a second body portion 560. These body portions can be formed as an integral assembly, e.g., from a single piece of metal (such as copper). Embodiments include electrodes with no internal passages. The first body portion 510 extends from a first end 511 and has a first length L1 and a first width W1. The second body portion 560 has a second length L2 and a second width W2. Preferably, the first width W1 is a diameter and the second width W2 is a diameter.

As will be understood from considering the electrode 202 depicted in FIG. 5, in combination with the sectional torch view of FIG. 3, the ratio of the first length L1 to the first width W1 directly affects the pointedness (i.e., the viewing angle) of the torch. A longer first length L1 and a smaller first width W1 both promote the pointedness feature of the invention. More particularly, a ratio of the first length L1 to the first width W1 of at least about 3 facilitates the large viewing angle of the high visibility torch of the invention. A ratio of the first length L1 to the first width W1 of about 4 to about 9 also achieves these objectives, or of between 4 and 8 for some embodiments, or between 4.0 and 7.0, 5.0 and 7.0, 4.0 and 5.0, 3.5 and 4.5, or at least about 4, or, e.g., of about 4.1 is particularly advantageous. This design parameter is used to optimally balance the heat conduction requirements through the first body portion 510 (i.e., between the emissive insert 203 and the cooling structure 370 of the second body portion 560) with the pointedness objective of the invention.

Previous first length L1 to first width W1 ratios in Hypertherm PAC 120 torches have had a ratio as high as 9.47, but these electrodes suffered from shorter life expectancy (duration) due to the excessively long, narrow heat conduction zone between the emissive insert 203 and the cooling structure 370. The thermal conductivity requirements and capabilities in copper electrodes such as these are such that the PAC 120 electrodes would not last as long as other products because insufficient heat conducting capacity was available, in part due to the excessively large first length to first width ratio. Stated formulaically, $$Q=k\,A\,dT/dx$$

In this equation, Q is the rate of heat conduction (i.e., heat transfer rate, e.g., BTU/sec), k is the heat transfer coefficient (e.g., BTU/ft/sec/degree F), A is the cross sectional area (e.g., square feet), dT is the differential temperature, and dx is length (e.g., ft). For a fixed cross-sectional area A, thermal conductivity k and temperature differential dT, as the length of the electrode increases (i.e., as dx increases) the first length L1 to first width W1 ratio increases, and Q (the heat transfer) is reduced. Thus, a long electrode (with a large first length L1) has a higher ratio of first length L1 to first width W1, which results in a poor (lower) heat transfer rate. This was the reason for the poor performance and failure of the PAC 120 electrodes discussed above.

Other Hypertherm electrodes have been on the lower end of this range. For example, Hypertherm MAX 40 electrodes have first length L1 to first width W1 ratio of about 3.7, Powermax 600 electrodes have a ratio of about 2.8, and other products (e.g., Powermax 1650, 1000, 380, and 190) electrodes have even lower ratio values. Although this ratio is an important feature of the invention, Applicants have learned that this ratio alone is insufficient to achieve the objectives of the invention. Rather, the first length L1 to first width W1 ratio feature must be combined with other design parameters to achieve the objectives of the invention.

For example, another important design parameter is the ratio of the second width W2 to the first width W1. Generally, a smaller ratio of these two widths would be desired to achieve torch pointedness. However, to achieve sufficient surface area for heat exchange and to properly accommodate for the first length L1 to first width W1 ratio as described above, the ratio of the second width W2 to the first width W1 should be greater than 1 and can be increased to at least about 2, or between about 2.0 and 2.5. The second width W2 must be greater than the first width W1 to achieve the electrode performance and reliability objectives, including the need to cool the electrode 202 and to provide sufficient blowback surface area to allow blowback operation of the electrode as gas pressure is exerted upon a blowback surface area within the second body portion 560 of the electrode 202.

Previous Hypertherm Powermax 380 electrodes have had a second width W2 to first width W1 ratio of about 2.1. However, Powermax 380 electrodes were unable to achieve the pointedness objectives of the invention because of a low first length L1 to first width W1 ratio (of about 2.4). Hypertherm's PAC 120 electrodes have a second width W2 to first width W1 ratio of only about 1.9. Other Hypertherm electrodes employ even smaller ratios, such as electrodes for Powermax 190, 1000, 1650, 600, and MAX 40 systems.

The increased second width W2 to first width W1 feature of the invention, in combination with the ratio of the first length L1 to the first width W1 discussed above, provides an electrode 202 that meets previous electrode (e.g., 202) reliability and performance objectives, while also achieving the pointedness objectives of the invention. The second width W2 to first width W1 design parameter also allows an increased force to be developed for a given pressure drop as the blowback gas flow passes through the cooling structure 370 of the second portion 560 of the electrode, by providing additional cross-sectional surface area within the second portion 560 of the electrode upon which the blowback gas can exert a blowback force. This feature is particularly useful for electrodes (e.g., 202) of the invention, which have an extended first portion 510 (i.e., a longer first length L1 to first width W1 ratio).

Yet another important design parameter is the ratio of the first length L1 to the overall length of the electrode. The overall length is the first length L1 plus the second length L2, and extends from the first end 511 to the second end 561 of the electrode. This ratio is indicative of the amount of extension of the first body portion 510 of the electrode beyond the second body portion 560, and is important because the exterior bearing surface of the second body portion 560 of the electrode provides alignment for the first body portion 510. Embodiments of the invention include a first length L1 to overall length ratio of greater than 0.6, or between 0.6 and 0.7. As this ratio increases, alignment of the electrode becomes less stable. As the ratio is decreased, it becomes less pointed.

Previous Hypertherm PAC 120 and MAX 40 electrodes have had a first length to overall length ratio of about 0.75. However, these electrodes were unable to achieve the performance and pointedness objectives of the invention because of a low second width to first width ratio (of about 1.8 and 1.6, respectively). Other Hypertherm electrodes employ even smaller ratios of first length to overall length, such as electrodes for Powermax 190, 380, 600, 1000, 1650 systems.

Extending the ratio of the first length L1 to the overall length to at least about 0.6, or to between about 0.6 and 0.7, in combination with a second width W2 to first width ratio of at least about 2, provides an electrode that meets previous electrode reliability and performance objectives, while also achieving the pointedness objectives of the invention. Applicants have determined that the first length L1 to overall length ratio can be extended to this amount while maintaining the second width W2 to first width W1 ratio at 2.0 or more, and that this configuration will still allow sufficient alignment capability to be retained for purposes of the invention. This combination of design features enables the pointedness objectives of the invention (i.e., the large viewing angle $\alpha$) to be obtained.

Figure 6:
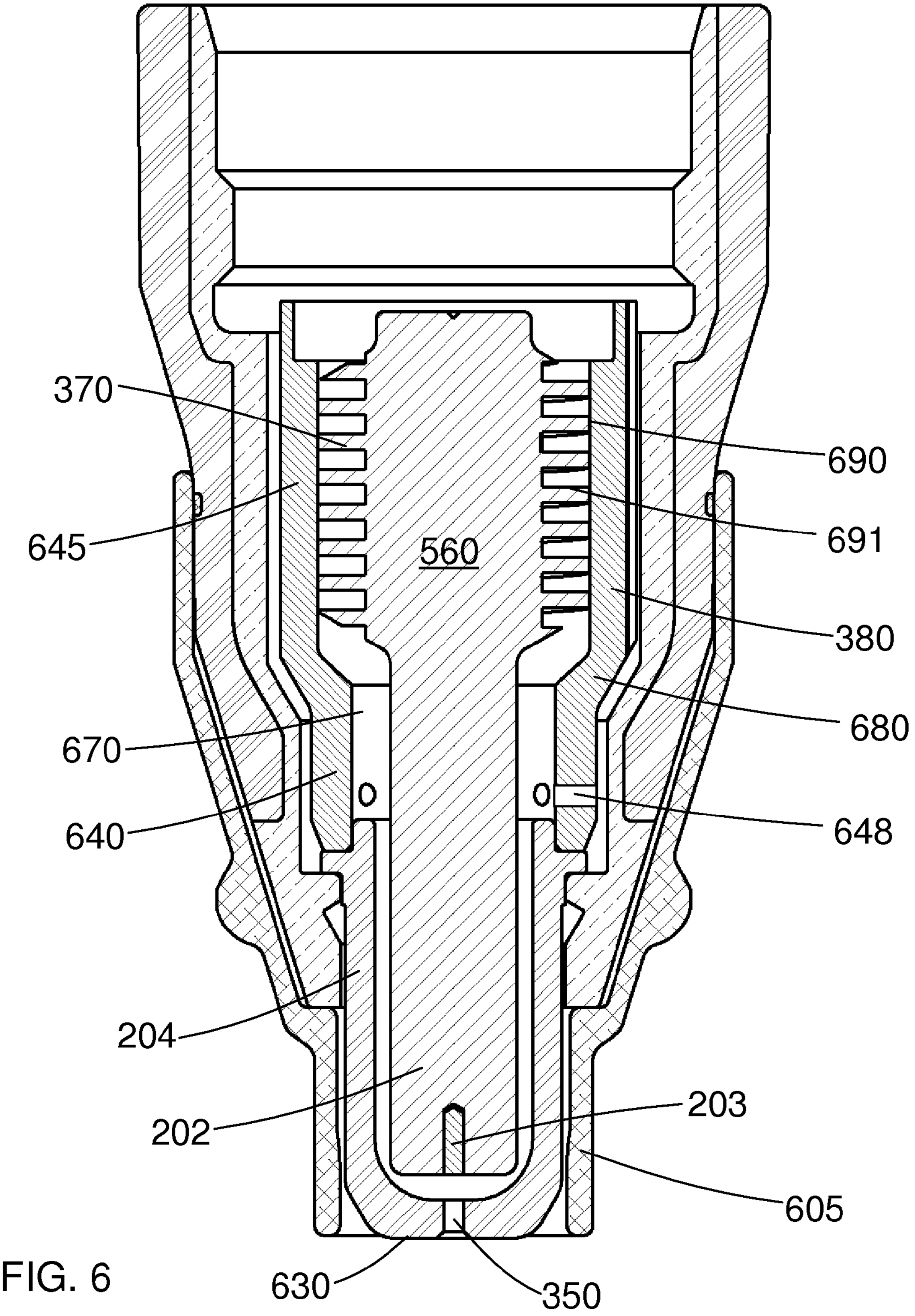
FIG. 6 is a cross-sectional view of a torch tip including a swirl ring according an embodiment of the invention.

FIG. 6 is a cross-sectional view of a torch tip including a gas control swirl ring 380 according an embodiment of the invention. The swirl ring 380 includes a body with a central gas passage 670 extending from one end to the other. A first body portion 640 of the swirl ring 380 has a first outside diameter and one or more plasma gas inlet ports (e.g., swirl holes) 648 in fluid communication with the central gas passage. The swirl holes 648 can impart a tangential velocity component to the gas flow, as is known to those of skill in the art. See, e.g., U.S. Pat. No. 5,170,033, the contents of which are incorporated herein by reference. A second body portion 645 of the swirl ring 380 has a second outside diameter that is larger than the first outside diameter of the first body portion 640. The first body portion 640 of the swirl ring 380 can be configured to be oriented towards a workpiece (not shown), and the second body portion 645 can be oriented away from the workpiece. The swirl ring 380 can include a transition portion 680 between the first 640 and second 645 body portions. The transition portion 680 can be, e.g., a bevel, a step, or a taper. The transition portion 680 can also include such shapes and configurations at an interior surface of the transition portion 680. One or more of the first body portion 640, the second body portion 645, or the transition portion 680, can be formed of a dielectric material.

A second inside diameter of the second body portion 645 can be different than a first inside diameter of the first body portion 640. Second inside diameter as depicted in FIG. 6 is larger than the first inside diameter. An inside surface of the second body portion 645 can define a bearing surface 690 against which an exterior surface of the second portion of the electrode 202 can slide. This surface can be configured to slideably engage with and provide a bearing and alignment surface for an adjacent structure, such as a torch electrode. The bearing surface 690 provides alignment of the electrode 202 within the torch body, resulting in alignment between the emissive insert 203 and the exit orifice 350 of the nozzle.

For proper operation of the high visibility torch, the gas swirl holes 648 should be located in the first body portion 640 of the swirl ring 380, although embodiments include one or more gas passages (such as swirl holes) in the transition portion (not shown). Gas passages (such as swirl holes) in the first body portion 640 can discharge plasma gas into a lower portion of the central gas passage 670. During startup of the torch, gas pressure builds in the lower portion of the central gas passage 670, exerting gas pressure against the cooling structure 370 in the second body portion 560 of the electrode, and resulting in blow back of the electrode from the nozzle 204. Location of the gas passages (such as swirl holes) in the first (lower) body portion 640 of the swirl ring 380 allows coordination of the electrode and swirl ring geometries, thereby allowing a diameter of the torch adjacent the lower, first body portion 640 of the swirl ring 380 to be reduced. As explained in more detail below, this allows the increased viewing angle $\alpha$ of the torch to be achieved.

Figure 7:
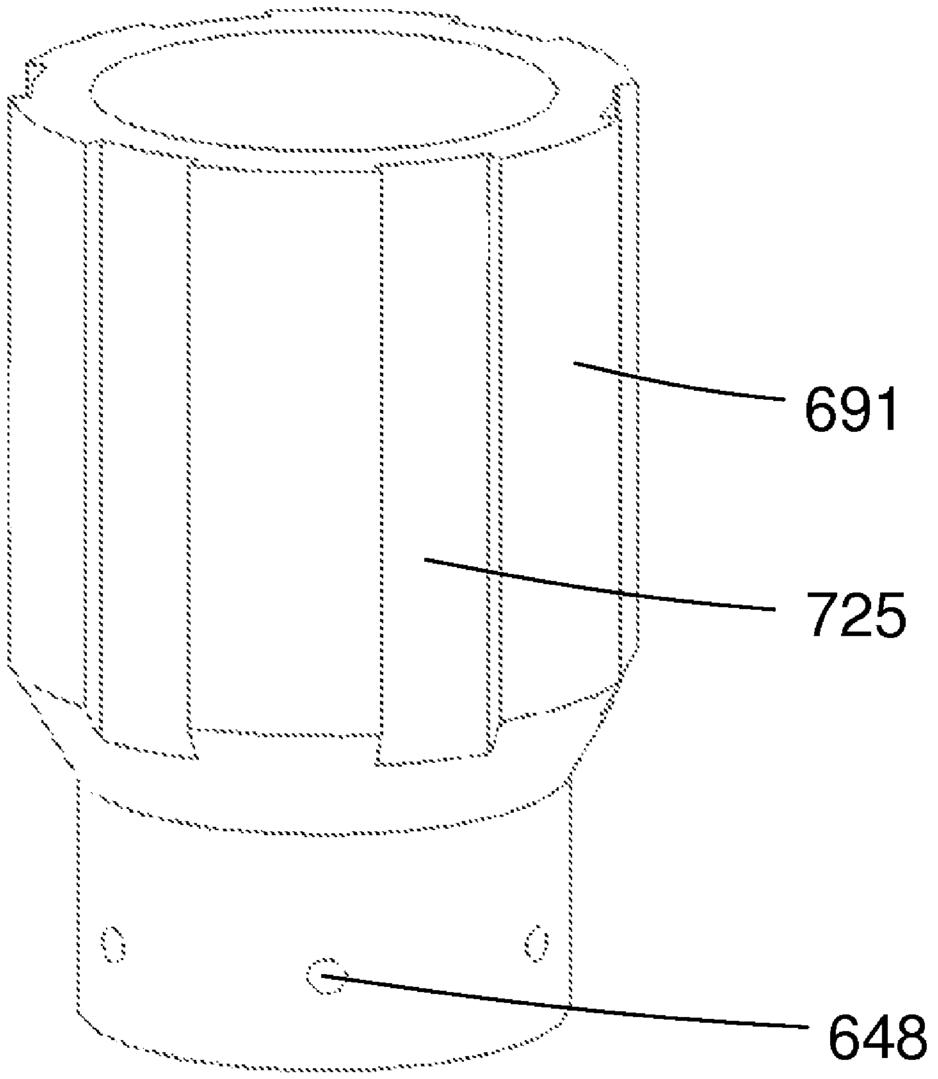
FIG. 7 is a perspective view of a swirl ring according to an embodiment of the invention that includes exterior flutes.

FIG. 7 is a perspective view of a swirl ring according to an embodiment of the invention that includes exterior flutes. When an exterior surface 691 of the second body portion of the swirl ring is closely coupled within the torch, one or more flutes 725 formed in the exterior surface 691 allow gas to flow from a gas supply connection above the swirl ring (not shown) to the swirl holes 648.

Figure 8:
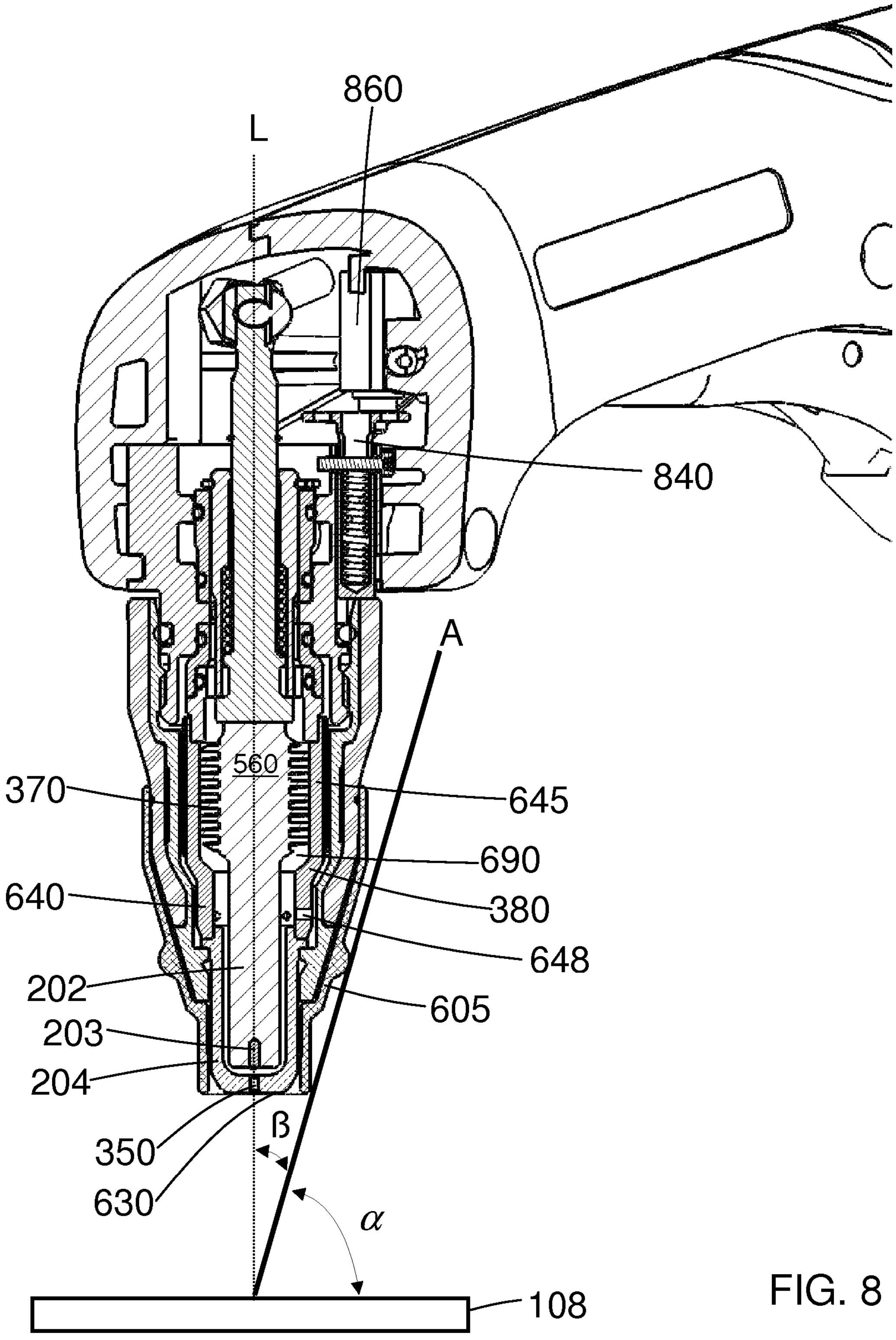
FIG. 8 is a cross sectional view of a torch that illustrates how different torch consumables can be stacked together.

FIG. 8 is a cross sectional view of a torch that illustrates how different torch consumables can be stacked together. A shield 605 surrounds a nozzle 204 and a swirl ring 380. Although the shield 605 illustrated does not have an end face, embodiments of the invention also include a shield that would have an end face to cover an end face 630 of the nozzle 204. The swirl ring 380 is shaped as described above to provide inlet gas swirl holes 648 in a lower, first body portion 640 of the swirl ring 380. A second body portion 645 of the swirl ring 380 also provides a bearing and alignment surface for the second body portion 560 of the electrode, and a cooling structure 370 of the electrode slideably engages the bearing surface 690. The electrode has a first body portion including a first length to first width ratio of between 4.0 and 9.0, and a first length to an overall length ratio of between 0.6 and 0.7. The ratio of the second width of the electrode to the first width of the electrode is over 2.0. Combining these consumables in the manner shown results in a torch that maintains superior performance and reliability objectives while increasing the user viewing angle $\alpha$ to about 75°.

Also facilitating torch visibility is a plunger pin 840 and switch assembly 860 disposed within the torch body, discussed more fully below.

Figure 9:
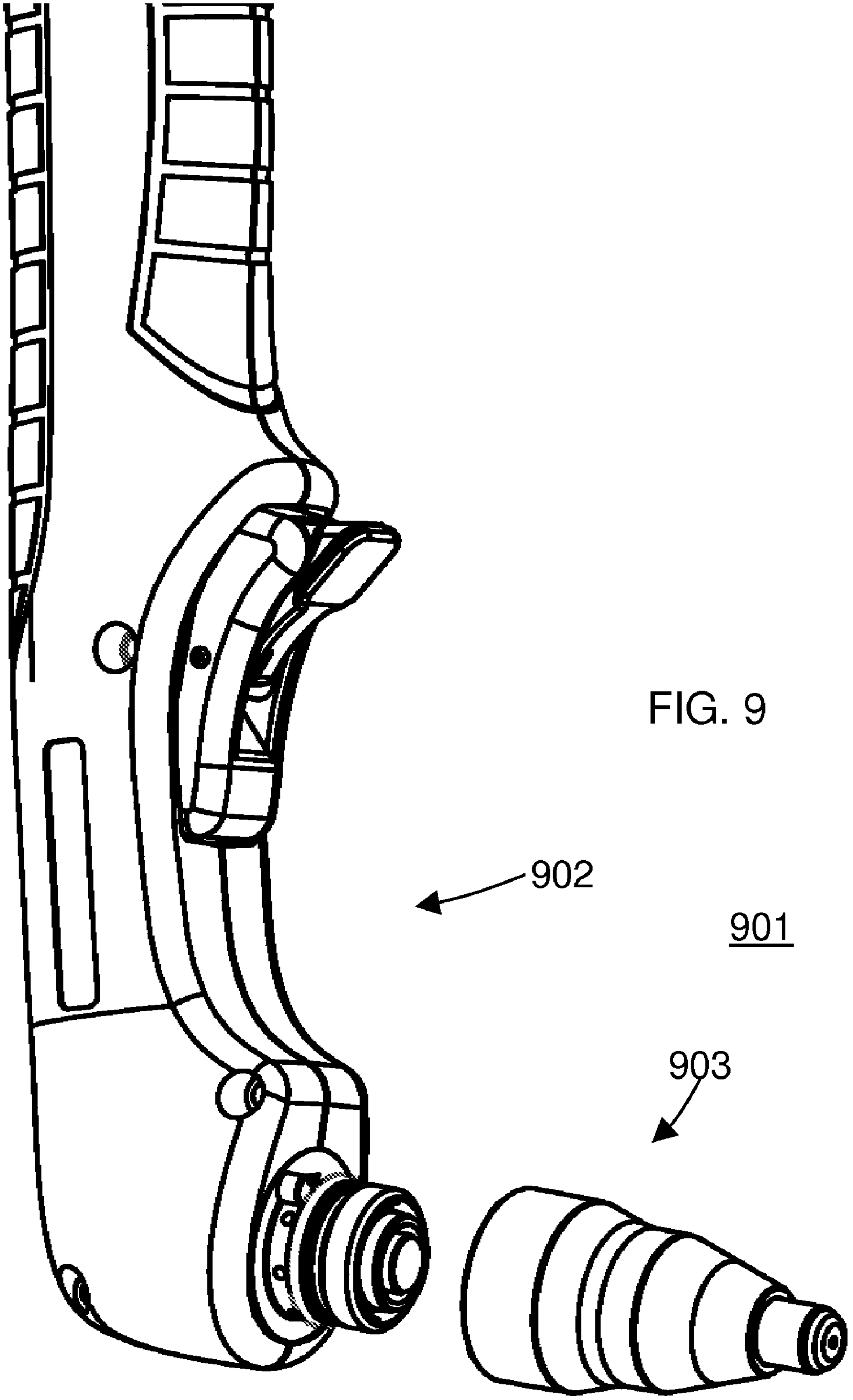
FIG. 9 is a view of a torch handle assembly and a removable component assembly illustrating an embodiment of the present invention.

FIGS. 9-15 illustrate another embodiment of the invention in which the profile of the torch is minimized to reduce the obstruction angle $\beta$ (see FIG. 8) by positioning components of a safety system at least in part within the outer periphery of the anode body. As shown in FIG. 9, the torch assembly 901 is generally comprised of two sub-assemblies, a torch handle assembly 902 and a removable component assembly 903. The components constituting the removable component assembly 903 are described in other embodiments, and identical features will not be repeated in the description of this embodiment. In this embodiment of the invention, the safety system detects whether removable component assembly 903 is properly engaging torch handle assembly 902 and, if so, allows power to be supplied to the torch using known control methods.

Figure 10:
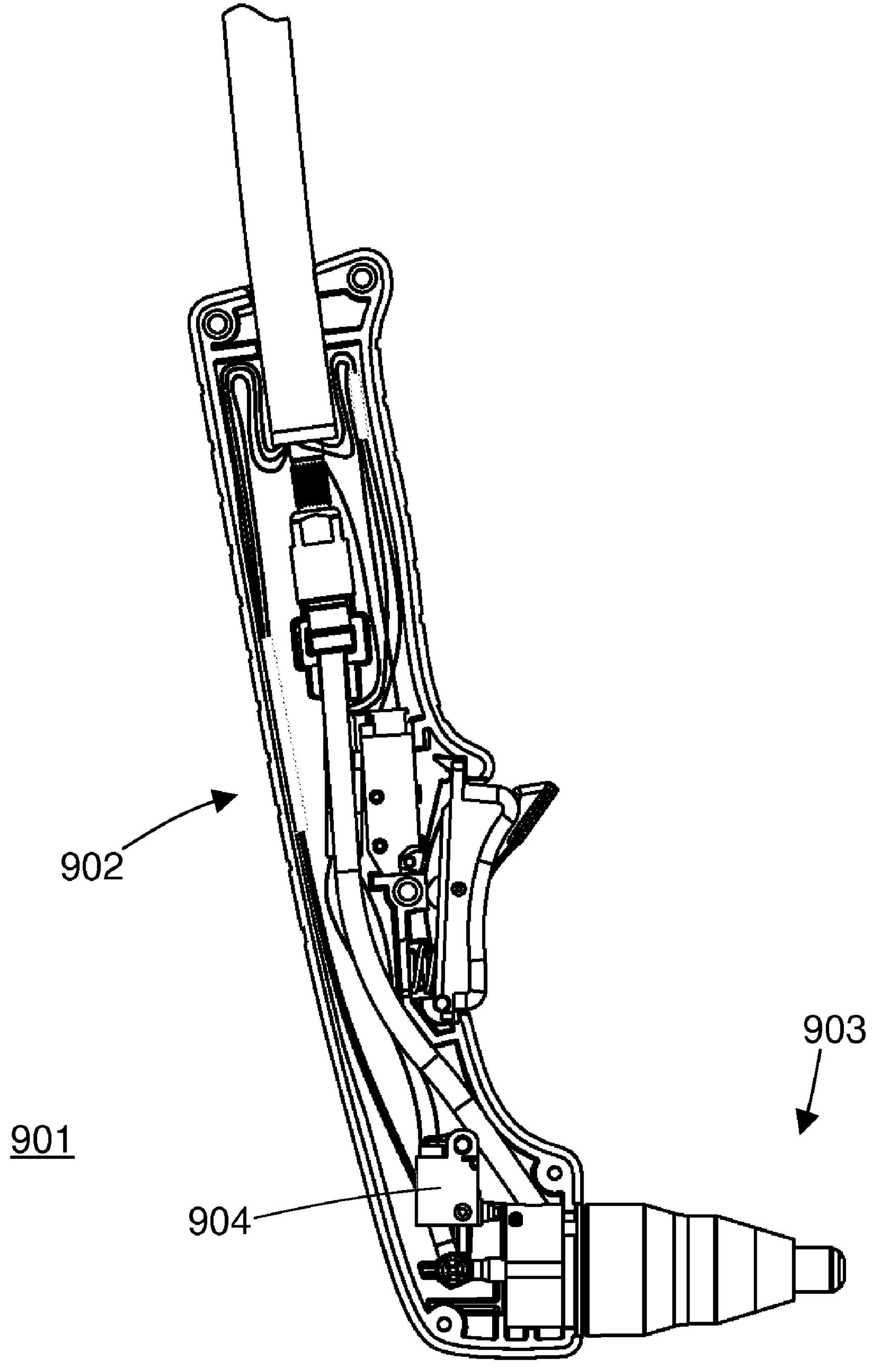
FIGS. 10-11 are internal views of the assembled torch handle and removable component assemblies, illustrating the internal components of the torch handle assembly incorporating the present invention.
Figure 11:
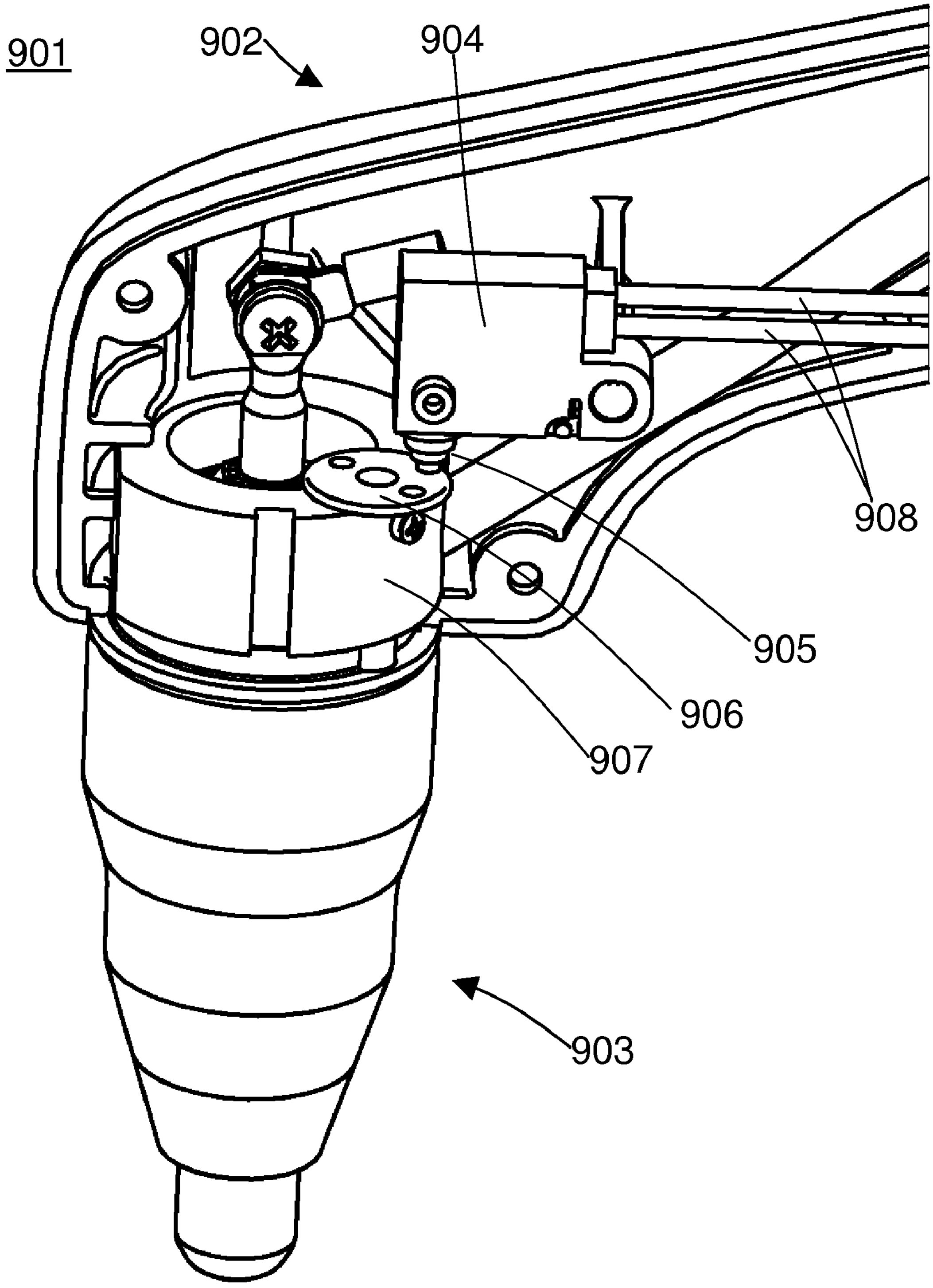

As shown in FIGS. 10 and 11, torch handle assembly 902 is shown with part of the outer handle enclosure removed. Torch handle assembly 902 encloses switch 904 which is electrically connected by wires 908 to a control circuit (not shown) controlling the operation of the torch using known control methods to provide or withhold power to the torch in relation to the activation and deactivation of switch 904. Extending from switch 904 is a button 905 which is the activating portion of switch 904. Button 905 engages pin 906, and pin 906 is disposed in a passage through torch body 907, which is described in more detail below.

Figure 12:
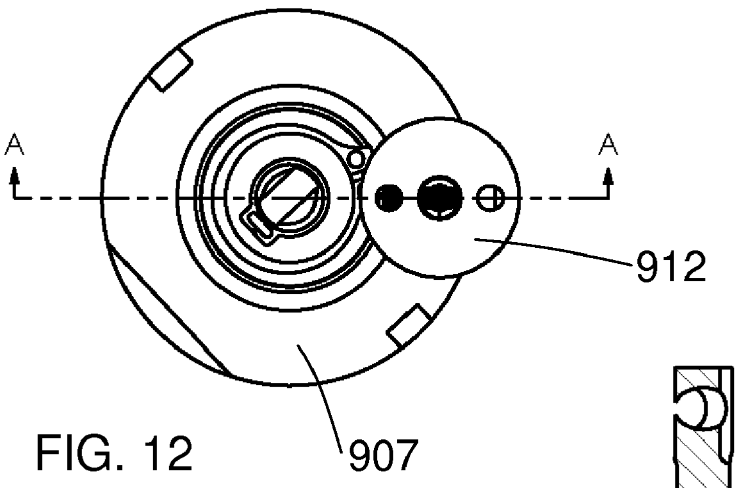
FIG. 12 is a top view of some of the internal components of the torch handle assembly.
Figure 13:
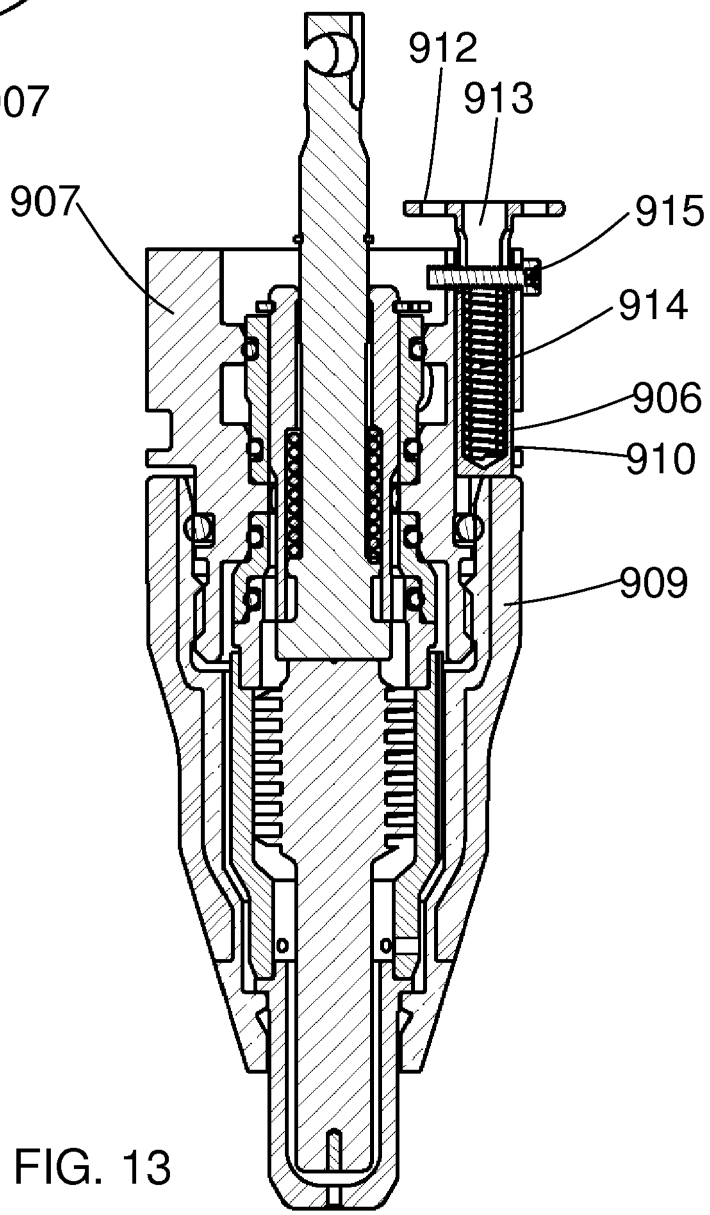
FIG. 13 is cross-sectional view taken along line A—A illustrating some of the internal components of the torch handle and removable component assemblies.

FIGS. 12 and 13 illustrate the internal arrangement of some of the components within the torch handle assembly 902 and removable component assembly 903. FIG. 12 illustrates a top view of the torch body 907 and the flange 912 of the pin 906. FIG. 13 illustrates the cross-sectional view of FIG. 12 along a section of the A-A line. Torch body 907 is disposed to engage portions of the removable component assembly 903, such as retaining cap 909. As described in previous embodiments, torch body 907 functions to hold other components of the removable component assembly 903 in place and to in part define a chamber holding gases used in the operation of the torch. Torch body 907 is generally electrically conductive and made of a metal. Enclosing a portion of torch body 907 is retaining cap 909 which reduces exposure of the torch operator to electrical components within the torch. When torch body 907 is disposed within the torch handle assembly 902, as shown in FIG. 11, the enclosure of the torch handle assembly 902 provides an insulation barrier protecting another portion of torch body 907.

Figure 15:
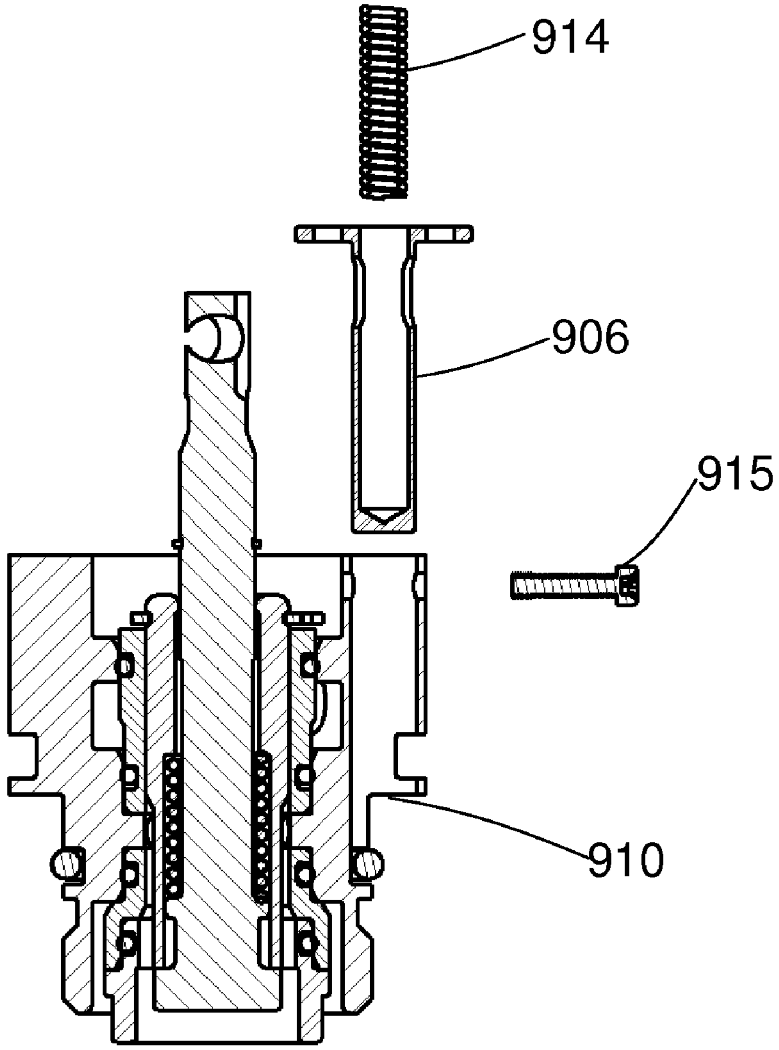
FIG. 15 is cross-sectional view taken along line B—B illustrating the assembly of some of the internal components of the torch handle assembly.

Through torch body 907 is a passage 910, which is shown clearly in FIG. 15. Passage 910 is within the outer peripheral or outer diameter surface of torch body 907, but the passage could also pass through only a portion of torch body 907 so as to form a channel in the peripheral surface of the torch body. In the preferred embodiment, passage 910 is located fully within the outer peripheral surface of the torch body 907. Passage 910 slideably supports pin 906 so the pin can move in a direction parallel to the axis of the torch body. However, passage 910 and pin 906 can be arranged in other orientations with the axis of the torch body, such as in an angled arrangement compared to the axis of the torch body. As shown in FIG. 13, pin 906 engages a surface of retaining cap 909 when the cap 909 is engaging the torch handle assembly 902 as part of a removable component assembly 903. The surface of retaining cap 909 pushes against pin 906 as the cap 909 is seated in position, pin 906 is moved axially further into torch handle assembly 902 to engage button 905 and activate switch 904, satisfying a safety switch, and thereby allowing the control circuit to provide power to the torch. When removable component assembly 903 is not engaging torch handle assembly 902, or is in an improper position, retaining cap 909 fails to push pin 906 which in turn fails to activate switch 904 thereby preventing the supplying of power to the torch. By this method, the safety system detects the proper positioning of the removable components in the torch assembly.

Pin 906 can include a flange 912 on an end of the pin. Flange 912 effectively broadens the diameter of pin 906 at the end of the pin that engages button 905. This arrangement allows pin 906 and passage 910 to be placed in a position nearer the axis of the torch body 907, and within the peripheral surface of torch body 907, while locating switch 904 at a position that is farther from the axis of the torch body. Flange 912 can be circular in shape so that any rotation of pin 906 in passage 910 still allows button 905 to engage the flange. Flange 912 also prevents pin 906 from exiting passage 910 in a direction out of torch handle assembly 902. Pin 906 can also be composed of several pins, with at least some of the pins not sharing the same axis. However, the preferred embodiment uses a single pin (e.g., 906).

As shown in FIG. 13, pin 906 can also have an internal cavity 913 that provides a space (e.g., a cavity) to hold spring 914. Slots through the pin 906 allow a screw 915 to be inserted to hold the spring 914 in a compressed state. As shown in FIG. 13, when the spring 914 is compressed, it will push against the screw 915 at one end and the other end of the spring will bias pin 906 in a direction out of torch handle assembly 902, so that it remains disengaged from button 905 when removable component assembly 903 does not properly engage the torch handle assembly 902.

Figure 14:
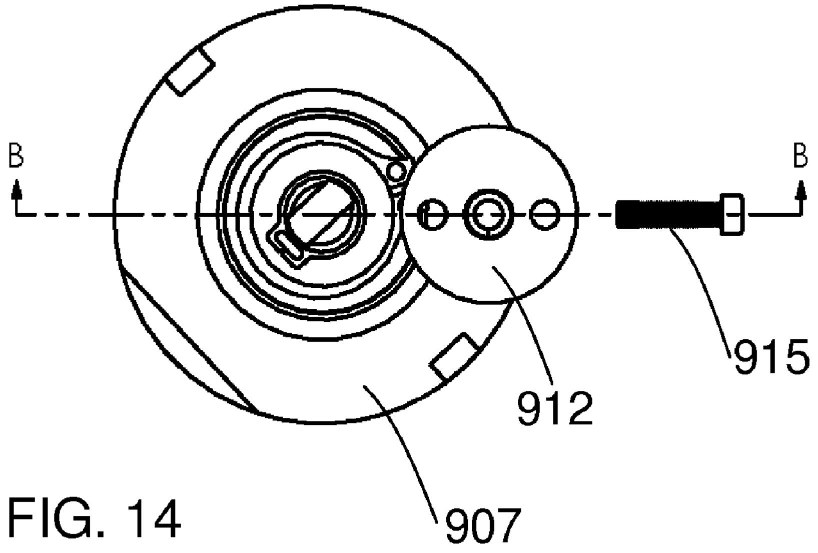
FIG. 14 is a top view of some of the internal components of the torch handle assembly, illustrating the assembly method for the pin.

FIGS. 14 and 15 illustrate an exploded view of the pin 906, spring 914, and screw 915 as shown in FIGS. 12 and 13. FIG. 14 illustrates a top view of the torch body 907, the flange 912 of the pin 906, and the screw 915. FIG. 15 illustrates the cross-sectional view of FIG. 14 along a section of the B-B line.

While the invention has been particularly shown and described with reference to specific preferred embodiments, it should be understood by those skilled in the art that various changes in form and detail can be made therein without departing from the spirit and scope of the invention as defined by the appended claims.

We claim:

1. An electrode for a high visibility plasma arc cutting torch comprising:

an elongated electrode body having a first end and a second end, the body defining a bore in the first end for receiving an insert, the electrode body including:

(i) a first body portion extending from the first end and having a first length and a first width; and (ii) a second body portion extending to the second end and comprising a second length and a second width, wherein a ratio of the second width to the first width is at least about 2, and a ratio of the first length to the first width is at least about 3.

2. The electrode of claim 1, wherein the ratio of the second width to the first width is between about 2 and 2.5.

3. The electrode of claim 1, wherein the ratio of the first length to the first width is between 3.5 and 4.5.

4. The electrode of claim 1, wherein the ratio of the first length to the first width is at least about 4.

5. The electrode of claim 1, the body having a distance from the first end to the second end that defines an overall length, such that a ratio of the first length to the overall length is at least about 0.6.

6. The electrode of claim 1, the second body portion including at least one rib that at least partially defines a cooling gas passage adjacent an exterior surface of the second body portion.

7. The electrode of claim 6, wherein the second body portion further defines a shoulder having an imperforate face that blocks passage of a gas flow through the second body portion.

8. The electrode of claim 7, wherein at least one of the cooling gas passage or the imperforate face is configured to provide a gas pressure drop sufficient to enable a motion of the electrode with respect to an anode.

9. The electrode of claim 1, wherein the first and second body portions are formed integrally of a solid material.

10. The electrode of claim 1, wherein at least one of the first width and the second width is a diameter.

11. A method of cutting a workpiece comprising the steps of:

providing a plasma arc torch comprising the electrode of claim 1; and supplying an electrical current to the electrode to energize the torch.

12. A plasma arc torch comprising the electrode of claim 1.

13. An electrode for a high visibility plasma arc cutting torch comprising:

an elongated electrode body having a first end and a second end, a distance from the first end to the second end defining an overall length, the body defining a bore in the first end for receiving an insert, the electrode body including:

(i) a first body portion extending from the first end and having a first length and a first width; and (ii) a second body portion extending to the second end and comprising a second length and a second width, wherein a ratio of the second width to the first width is at least about 2, and a ratio of the first length to the overall length is at least about 0.6.

14. The electrode of claim 13, wherein the ratio of the second width to the first width is between 2 to 2.5.

15. The electrode of claim 13, wherein the ratio of the first length to the overall length is between 0.6 to 0.7.

16. The electrode of claim 13, wherein a ratio of the first length to the first width is at least about 3.

17. The electrode of claim 16, wherein the ratio of the first length to the first width is at least about 4.

18. The electrode of claim 13, the second body portion including at least one rib that at least partially defines a cooling gas passage adjacent an exterior surface of the second body portion.

19. The electrode of claim 18, wherein the second body portion further defines a shoulder having an imperforate face that blocks passage of a gas flow through the second body portion.

20. The electrode of claim 19, wherein at least one of the cooling gas passage or the imperforate face is configured to provide a gas pressure drop sufficient to enable a motion of the electrode with respect to an anode.

21. The electrode of claim 13, wherein the first and second body portions are formed integrally of a solid material.

22. The electrode of claim 13, wherein at least one of the first width and the second width is a diameter.

23. A method of cutting a workpiece comprising the steps of:

providing a plasma arc torch comprising the electrode of claim 13; and supplying an electrical current to the electrode to energize the torch.

24. A plasma arc torch comprising the electrode of claim 13.

* * * * *